United States Patent
Ikegami et al.

(10) Patent No.: US 11,071,281 B1
(45) Date of Patent: Jul. 27, 2021

(54) CAT ATTRACTANT BALL

(71) Applicant: THE HARTZ MOUNTAIN CORPORATION, Secaucus, NJ (US)

(72) Inventors: Takeshi Ikegami, Tokyo (JP); Johann Soto, Rutherford, NJ (US)

(73) Assignee: THE HARTZ MOUNTAIN CORPORATION, Secaucus, NJ (US)

( * ) Notice: Subject to any disclaimer, the term of this patent is extended or adjusted under 35 U.S.C. 154(b) by 0 days.

(21) Appl. No.: 17/225,371

(22) Filed: Apr. 8, 2021

Related U.S. Application Data

(63) Continuation of application No. 16/541,756, filed on Aug. 15, 2019, now Pat. No. 11,000,015.

(60) Provisional application No. 62/859,848, filed on Jun. 11, 2019.

(51) Int. Cl.
*A01K 15/02* (2006.01)

(52) U.S. Cl.
CPC ................................. *A01K 15/025* (2013.01)

(58) Field of Classification Search
CPC ................ A01K 15/025; A01K 15/026; A23V 2200/09; Y10S 426/805
See application file for complete search history.

(56) References Cited

U.S. PATENT DOCUMENTS

| | | |
|---|---|---|
| 848,136 A | 3/1904 | Smith |
| 1,006,182 A | 10/1911 | Cousin |
| 1,022,112 A | 4/1912 | Smith |
| 1,031,095 A | 7/1912 | Smith |
| 1,265,926 A | 5/1918 | Ludlam |
| 1,534,964 A | 4/1925 | Kahnweiler |
| 3,945,568 A | 3/1976 | Bychowski |
| 5,009,193 A | 4/1991 | Gordon |
| 5,191,856 A | 3/1993 | Gordon |
| 5,595,142 A | 1/1997 | Chill |
| 5,640,931 A | 6/1997 | Markham |
| 5,778,825 A | 7/1998 | Krietzmen |
| 5,832,877 A | 11/1998 | Markham |
| 5,935,628 A | 8/1999 | Hauser |
| 5,984,884 A | 11/1999 | Alvarez |
| 6,089,947 A | 7/2000 | Green |
| 6,155,905 A | 12/2000 | Truax |
| 6,248,377 B1 | 6/2001 | Levine |
| 6,371,053 B1 | 4/2002 | Tsengas |
| 6,405,682 B1 | 6/2002 | Simon |
| 6,415,741 B2 | 7/2002 | Suchowski |
| 6,474,268 B1 | 11/2002 | Suchowski |

(Continued)

FOREIGN PATENT DOCUMENTS

JP 2005279227 10/2005

OTHER PUBLICATIONS

From the Field: Ultimate Blend Silver Vine and Catnip, https://web.archive.org/web/20161110110637/https://www.fromthefieldpet.com/silvervine.html, published Nov. 10, 2016.

*Primary Examiner* — Kathleen I Alker
(74) *Attorney, Agent, or Firm* — Gottlieb, Rackman & Reisman, P.C.

(57) ABSTRACT

A cat toy includes a hollow structure and a clump of material disposed within the hollow structure. The clump of material includes cat attractant material. The hollow structure has at least one opening configured to release an aroma of the cat attractant material outside of the hollow structure and to maintain the clump of material entrapped within the hollow structure.

20 Claims, 4 Drawing Sheets

(56) References Cited

U.S. PATENT DOCUMENTS

| | | |
|---|---|---|
| 6,484,671 B2 | 11/2002 | Herrenbruck |
| 6,672,254 B1 | 1/2004 | Butts |
| 6,899,059 B1 | 5/2005 | Crane |
| 7,063,044 B2 | 6/2006 | Handelsman |
| 7,146,934 B1 | 12/2006 | Staley |
| 7,357,421 B2 | 4/2008 | Locker |
| 7,389,748 B2 | 6/2008 | Shatoff |
| 7,926,450 B1 | 4/2011 | Tsengas |
| 8,225,747 B2 | 7/2012 | Markham |
| 8,584,620 B2 | 11/2013 | Rutherford |
| 9,101,114 B2 | 8/2015 | Lipscomb |
| 9,107,390 B1 | 8/2015 | Day |
| 9,125,401 B1 | 9/2015 | Tsengas |
| 9,737,054 B2 | 8/2017 | Nielsen |
| 9,943,069 B2 | 4/2018 | Zhang |
| 9,999,199 B1 | 6/2018 | Dadalto |
| 2004/0142073 A1 | 7/2004 | Buchanan |
| 2005/0045115 A1 | 3/2005 | Mann |
| 2006/0054106 A1 | 3/2006 | Renforth |
| 2007/0022971 A1 | 2/2007 | Renforth |
| 2009/0114166 A1* | 5/2009 | Saborio ............... A01K 15/026  119/702 |
| 2011/0253061 A1* | 10/2011 | Newman .............. A01K 15/025  119/707 |
| 2012/0145091 A1 | 6/2012 | Wang |
| 2015/0013616 A1 | 1/2015 | Tsengas |
| 2016/0174527 A1 | 6/2016 | Campbell |
| 2016/0286761 A1 | 10/2016 | Ruckel |
| 2017/0000086 A1 | 1/2017 | Fletcher |
| 2018/0055013 A1 | 3/2018 | Daley |

* cited by examiner

CAT ATTRACTANT BALL

CROSS-REFERENCE TO RELATED APPLICATIONS

This non-provisional patent application claims priority under 35 U.S.C. § 120 to U.S. non-provisional patent application Ser. No. 16/541,756, filed on Aug. 15, 2019, which in turn claims priority under 35 U.S.C. § 119 to U.S. provisional patent application No. 62/859,848, filed on Jun. 11, 2019, the disclosures of which are incorporated by reference herein in their entireties.

TECHNICAL FIELD

The present invention relates to a cat toy, and more particularly, to a hollow ball containing cat attractant material therein.

DISCUSSION OF THE RELATED ART

There is a large variety of cat toys is the marketplace. Some toys require user manipulation in order to attract the cat into play, while others are of the type which the cat seeks out and plays with on its own. However, as many cat owners are aware, cats tend to exhibit a decreased interest in a toy with the passage of time. As a result of the decreased interest, cat owners are oftentimes faced with the dilemma of either abandoning or discarding the old toys. This, in turn, causes the owners to either invest in new toys or leave the cat with fewer or no toys with which to play.

SUMMARY

The present invention relates to a cat toy, which may be a hollow ball with perforations or open shell portions, or more broadly, to a cat toy which may be a hollow structure of any shape with open shell portions (the ball and the other types of hollow structures are collectively referred to as "ball" for brevity purposes). The ball includes cat attractant material inside. The cat attractant material may include catnip, silver vine, valerian root and/or tatarian honeysuckle.

The cat attractant material may be mixed together with a binder, for example, starch, as well as with an antioxidant. The mixture of cat attractant material, binder and antioxidant may be molded, compressed, or otherwise bound together into a clump of material. The clump is configured to release the aroma of the cat attractant material. In addition, the clump of material has a structure which resists crumbling or breaking from shock, but which is soft enough to be scratched and/or shaved by the structure/features of the interior surface of the ball.

The ball includes at least one opening or perforation in order to release the aroma of the cat attract material outside of the interior space of the ball in order to attract a cat into play. As can be appreciated, the aroma released from the at least one opening or perforation may induce a cat into exhibiting behaviors which the pet owner may find to be pleasing.

The clump is larger than the at least one opening or perforation in order to remain entrapped within the ball.

The ball includes at least one of a sharp edge and a protrusion disposed along its interior surface. The protrusion may be, for example, a thorn-like protrusion, a spike or a bump. The sharp edge and/or protrusion is configured to shave and/or scratch off material from the outer surface of the clump when colliding with the clump as a result of play or by intentionally shaking the cat toy.

The scratching and/or shaving of a portion of the clump exposes fresh cat attractant material on the surface of the clump. The freshly exposed cat attractant material releases its aroma from the at least one opening or perforation of the ball. The aroma of the freshly exposed cat attractant material invigorates the play between the cat and the toy.

Therefore, the cat will be interested in playing with the toy for a long period of time. In addition, the toy will have a long usable lifespan since the clump may be sized to be large enough in order to sustain material loss from the scratching/shaving over many playing sessions.

The sharp edge of the ball may be a sharp edge formed around the at least one opening or perforation in the interior side of the shell, or it may be a blade that protrudes slightly toward the center of the ball from the ball's interior surface. The ball may be provided with a plurality of protrusions and/or a plurality of sharp edges along its interior surface.

The ball may also be equipped with a bell and/or a light source on its interior space in order to further attract a cat into play.

In an embodiment, a cat toy includes a hollow structure and a clump of material disposed within the hollow structure. The clump of material includes cat attractant material. The hollow structure has at least one opening configured to release an aroma of the cat attractant material outside of the hollow structure and to maintain the clump of material entrapped within the hollow structure.

In an embodiment, a method of manufacturing a cat toy includes forming a clump of material, the clump including cat attractant material. The method includes forming a hollow structure with at least one opening therethrough. The method further includes disposing the clump of material inside of the hollow structure.

The hollow structure includes a protrusion on an inner side of the hollow structure, a sharp edge formed along the at least one opening on the inner side of the hollow structure, or a blade disposed on the inner side of the hollow structure. A width of the at least one opening is narrower than a width of the clump of material such that the clump of material is entrapped within the hollow structure. The at least one opening is configured to release an aroma of the cat attractant material outside of the hollow structure.

BRIEF DESCRIPTION OF THE DRAWINGS

The above and other features of the present invention will become more apparent by describing in detail exemplary embodiments thereof in conjunction with the accompanying drawings, in which.

DETAILED DESCRIPTION OF THE EMBODIMENTS

Figure 1:
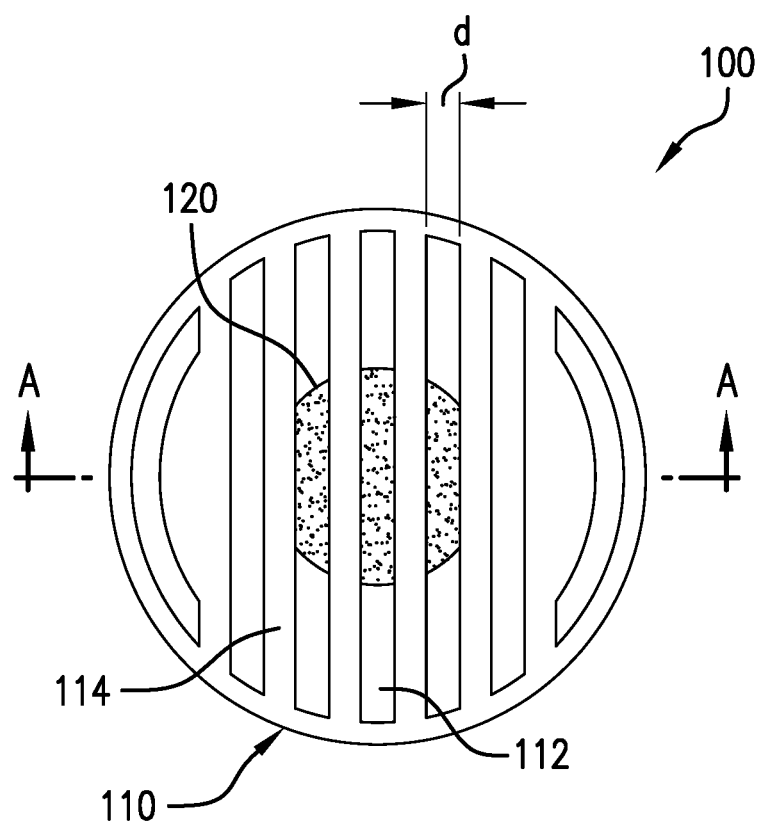
FIG. 1 is a front perspective view illustrating a cat toy according to an exemplary embodiment of the present invention.

Exemplary embodiments of the present invention will be described more fully hereinafter with reference to the accompanying drawings. The present invention may, however, be embodied in different forms and should not be construed as being limited to the embodiments set forth herein. Like reference numerals may refer to like elements throughout the specification. The sizes and/or proportions of the elements illustrated in the drawings may be exaggerated for clarity.

When an element is referred to as being disposed on another element, intervening elements may be disposed therebetween. In addition, elements, components, parts, etc., not described in detail with respect to a certain figure or embodiment may be assumed to be similar to or the same as corresponding elements, components, parts, etc., described in other parts of the specification.

Figure 2:
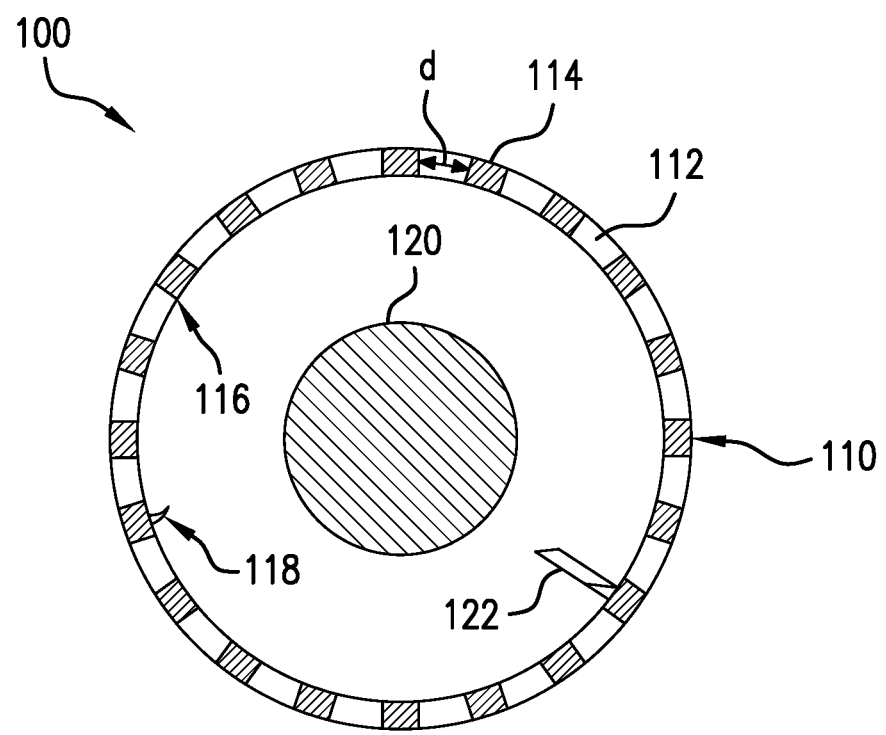
FIG. 2 is a simplified cross-sectional view taken along line A-A of FIG. 1.

FIGS. 1 and 2 illustrate a cat toy 100 according to an exemplary embodiment of the present invention. Referring to FIGS. 1 and 2, the cat toy 100 includes a hollow ball 110 and a clump of material 120 disposed inside of the ball 110. The clump of material 120 may be referred to as a "clump" 120 for brevity purposes. The clump 120 contains cat attractant material, and may be a solid object. Therefore, the clump 120 may maintain its own shape when resting along a supporting surface.

In FIG. 2, the clump 120 is illustrated as being suspended or disposed at the center of the ball 110. It should be understood that when the toy 100 is in a resting state, the clump 120 would rest at the bottom of the interior surface of the ball 110 by virtue of gravity.

Referring to FIGS. 1 and 2, the composition of the clump 120 may include at least one cat attractant material selected from a group consisting of catnip, silver vine, valerian root and tatarian honeysuckle, as well as an antioxidant and a binder. In an embodiment, the antioxidant and/or binder are optional. In an embodiment, the cat attractant material is catnip. In an embodiment, the cat attractant material is silver vine. In an embodiment, the cat attractant material is a mixture of catnip and silver vine. The cat attractant material may be a mixture of silver vine and catnip in order to be effective on a large number of cats since some cats react to catnip but not to silver vine, and other cats react to silver vine but not to catnip. When the cat attractant material includes catnip and silver vine, the ratio of silver vine to catnip may range preferably from 2:1 to 1:2, from 5:1 to 1:5, or from 20:1 to 1:20.

The binder is used to bind the cat attractant material and the antioxidant together such that the mixture of cat attractant material, antioxidant and binder form a solid structure that maintains its shape when resting along a supporting surface. In addition, the binder may prevent the clump 120 from crumbling or breaking due to shock. The binder may be, for example natural and/or artificial starch, natural and/or artificial flour (e.g., wheat flour, tapioca flour, cassava flour), natural and/or artificial gums (e.g., guar gum, xanthan gum, psyllium gum), and/or an egg (or a portion of an egg). The binder may also be a water-soluble substance that can facilitate binding the cat attractant material and the antioxidant into a solid structure.

The antioxidant may be used to, for example, maintain the freshness of the cat attractant material in order to prolong the efficacy of the clump 120. The antioxidant may be, for example, vitamin A, vitamin E, vitamin C, carotenoids (e.g., beta carotene, lycopene, lutein, zeaxanthin), selenium, curcumin, alpha lipoic acid, and/or astaxanthin.

The clump 120 may also include filler material. The filler material may be at least one of wood cellulose, dry grass, soy, wheat, rice, cereal grains (e.g., corn bran, rice bran, etc.), hulls or husks (e.g., oat hulls, soybean hulls, peanut hulls, etc.), etc.

In an embodiment, the clump 120 is composed of 100% cat attractant material. In an embodiment, the clump 120 is composed of 95% cat attractant material and 5% binder. In an embodiment, the clump 120 is composed of 95% cat attractant material, 4.5% binder, and 0.5% antioxidant. In an embodiment, the clump 120 is composed of 60% cat attractant material, 4.50% binder, 35% antioxidant, and 5.5% filler material. The composition percentages provided hereinabove may be measured by weight.

Each of the cat attractant material, binder, and antioxidant component may be ground to a small size in order to be molded, compressed or to otherwise be bound to one another in order to form the clump 120. The cat attractant material may be ground to a size such that, for example, 90% or more of the ground particles of the cat attractant material pass through a United States size no. 50 sieve. However, it is understood that the size of the particles of the cat attractant material may be varied as needed, and is not limited to the size described above. Merely as an example, the cat attractant material may include particles ranging from about 0.04 inch to about 0.0070 inch.

Referring to FIGS. 1 and 2, the ball 110 may be a hollow sphere. The ball 110 has a shell including a plurality of open portions 112 and a plurality of closed portions 114. The open portions 112 allow the aroma released by the cat attractant material included in the clump 120 to be dispersed from the ball 110. The aroma of the clump 120 can attract a cat into play and/or to exhibit a range of behaviors which the owner may find pleasing.

The ball 110 may be elastic or rigid. The ball 110 may be made at least partially from, for example, a polymer material. As an example, the ball 110 may be made of, at least in part, natural polyisoprene (e.g., polyisoprene natural rubber and polyisoprene gutta-percha), synthetic polyisoprene (e.g., isoprene rubber), polybutadiene (e.g., butadiene rubber), chloroprene rubber (e.g., polychloroprene, neoprene, baypren etc.), butyl rubber (e.g., copolymer of isobutylene and isoprene), halogenated butyl rubbers (e.g., chloro butyl rubber, bromo butyl rubber), styrene-butadiene rubber (e.g., copolymer of styrene and butadiene), acrylonitrile-butadiene-styrene copolymer (ABS), nitrile rubber (e.g., copolymer of butadiene and acrylonitrile), hydrogenated nitrile rubbers, ethylene propylene rubber, ethylene propylene diene rubber, epichlorohydrin rubber, polyacrylic rubber, silicone, fluorosilicone rubber, fluoroelastomers, perfluoroelastomers, polyether block amides, polyethylene, polypropylene and/or ethylene-vinyl acetate. It is understood that these are non-limiting examples of polymer materials that can be used to form the ball 110. The preferred polymer material(s) for making the ball 110 is/are ABS and/or polypropylene plastic. For example, at least the interior portion of the ball 110 may be made of ABS.

When the ball 110 is elastic, the closed portions 114 may be flexible, and consequently, deformable. The closed portions 114 may be spring back into their original curved shape after being deformed due to their elasticity. In addition, the closed portions 114 may be deformed to create an open portion 112 that is wide enough to insert the clump 120 inside of the ball 110, or to remove the clump 120 from the interior of the ball 110.

Referring to FIGS. 1 and 2, a width "d" of the open portions 112 in their original shape and position should be smaller than the size of the clump 120 such that the clump 120 may remain trapped inside of the ball 110.

Merely as an example, the clump 120 may have a size ranging from approximately 0.25 inch to approximately 0.5 inch.

The closed portions 114 may also be deformable inwards into the ball such that the toy 100 may be bouncy, and/or to absorb some of the impact when colliding with a cat in order to reduce/prevent injury.

In addition, or alternatively, the ball 110 may be made at least partially of wood or bamboo material, or of another lightweight metal such as, for example, titanium, magnesium, aluminum, etc.

As described above, the clump 120 may have a structure that will not break or crumble inside of the ball 110 by the shock, bumps and hits that it can be subjected to when the toy 100 is used in normal playing conditions. However, the clump 120 has a structure that is soft enough such that a portion of the clump 120 can be scraped, shaved off, and/or scratched when colliding with certain elements disposed along the interior surface of the ball 110, as described below.

As shown in FIG. 2, at least one of the closed portions 114 may have at least one sharp interior edge 116. The at least one sharp interior edge 116 may extend along at least a portion of the length of the at least one closed portion 114.

When a cat plays with the toy 100, or by shaking the toy 100 prior to or during the playing session, the clump 120 collides with the at least one sharp interior edge 116, causing a portion of the clump 120 to be scraped or shaved off. The scraping/shaving off of a portion of the clump 120 exposes fresh cat attractant material on the exterior surface of the clump 120. The aroma released by the exposed cat attractant material may therefore be stronger, fresher, and/or more potent than the aroma released by the clump 120 prior to scraping. Accordingly, a cat will maintain its interest in playing with the toy 100.

The sharp interior edge 116 may be made of the same material as, or of a different material than, the material(s) included in the composition of the ball 110. The sharp interior edge 116 may be a sharp edge formed on the interior side of a closed portion 114, adjacent to the border of an open portion 112, as shown in FIG. 2. Alternatively, or in addition, a sharp interior edge may be a longitudinally-extending blade such as, for example, a blade 122 illustrated in FIG. 2. The blade 122 may protrude from the inside surface of the ball 110 toward the center of the ball 110.

Referring to FIG. 2, as least one of the closed portions 114 may have a protrusion 118.

The protrusion 118 may be, for example, a spike, a bump or a thorn-like protrusion extending from the interior surface of the ball 110 toward the center of the ball 110. The protrusion 118 may be made of the same material as, or of a different material than, the material(s) included in the composition of the ball 110. The protrusion 118 may be an integral part of the shell of the ball 110, for example, an integral part of at least one of the closed portions 114, or may be separately attached to the closed portions 114 on the interior of the ball 110.

When the clump 120 collides with the protrusion 118, the clump 120 is scratched, thereby exposing fresh cat attractant material on the exterior surface of the clump 120. This, in turn, keeps the cat interested in playing with the toy 100 due to the release of aroma of fresh cat attractant material.

The size of the protrusion 118 may range, for example, from about 0.5 mm to about 2 mm. It is understood that this size range is merely exemplary, and the present invention is not limited thereto. Therefore, the protrusion 118 and/or the sharp interior edge 116 may scrape, shave and/or chip off enough material from the clump 120 in order to expose sufficient fresh cat attractant material on the surface of the clump 120 while minimizing the loss of material to the clump 120.

FIG. 2 illustrates that the toy 100 includes one sharp edge 116 and one protrusion 118. However, this is merely exemplary. For example, the toy 100 may include at least one sharp edge 116 and no protrusion 118, at least one protrusion 118 and no sharp edge 116, or a plurality of sharp edges 116 and a plurality of protrusions 118.

In FIGS. 1 and 2, the clump 120 is illustrated as having a quasi-spherical shape. However, the present invention is not limited thereto. For example, the clump 120 may also be formed to have a polyhedral shape or an irregular shape.

When the clump 120 is a polyhedron, the corners and/or edges of the polyhedron may be easily scraped, shaved off and/or scratched when the clump 120 collides with sharp edge(s) 116 and/or protrusion(s) 118, as described above.

When irregularly shaped, the clump 120 may include flat surfaces, curved surfaces, protruding portions (e.g., spikes), zigzag or grooved outer surface portions, ridges, etc. Therefore, when the clump 120 is irregularly shaped, the irregularities may be easily scraped, shaved off and/or scratched from the exterior surface of the clump 120 during a playing session or by intentionally shaking the toy 100. This will keep a cat interested in the toy 100.

Figure 1A:
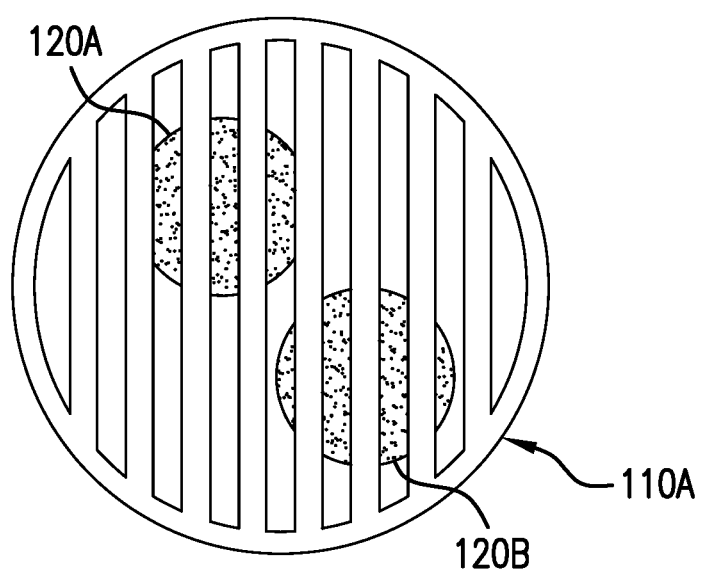
FIG. 1A is a front perspective view illustrating a cat toy according to an exemplary embodiment of the present invention.

FIGS. 1 and 2 illustrate that the toy 100 includes one clump 120. However, the present invention is not limited thereto. The toy 100 may also include a plurality of clumps disposed therewithin, as illustrated in FIG. 1A. For example, FIG. 1A illustrates a ball 110A which includes a first clump 120A and a second clump 120B. The clumps 120A and 120B may have the same composition, shape and/or size as each other, or a different composition, shape and/or size from one another.

FIGS. 1 and 2 illustrate that the ball 110 includes a plurality of open portions 112. However, this is merely exemplary. The ball 110 may be manufactured to have a single open portion 112 (not shown) because even a single open portion 112 will release the scent of the cat attractant material of the clump 120 to the outside.

The configuration of the open portion(s) 112, including the number, size and/or shape of the open portion(s) 112 may be varied as needed as long as the open portion(s) 112 is/are small enough to maintain the clump 120 entrapped within the ball 110.

In FIGS. 1 and 2, the toy 100 is shown as including a round ball 110. However, this is merely exemplary, and the present invention is not limited thereto. A cat toy of the present invention may have other hollow shapes, for example, a hollow ovoid shape, a hollow ellipsoid shape, a hollow polyhedral shape, or a hollow irregular shape having a shell with flat and/or curved portions.

Therefore, regardless of the shape of the cat toy, a cat toy of the present invention will have a hollow encapsulating structure with at least one open portion on its shell, at least one clump containing cat attractant material entrapped within the hollow encapsulating structure, and at least one sharp edge and/or a protrusion along an interior surface of the hollow encapsulating structure.

Therefore, a cat toy of the present invention will keep a cat interested in playing with the toy for a long period of time.

Although the cat toy 100 is described as containing one or more clumps 120 therein, the present invention is not limited thereto. The cat toy 100 may also include a bell and/or a light emitting device inside of the ball 110 in addition to the one or more clumps 120. Therefore, the cat toy 100 may further induce the cat into play and/or keep the cat playing with the toy 100 for a long period of time due to the bell chimes and/or flashing lights of the light emitting device.

The light emitting device may be a small electronic device that is configured to emit (or flash) light of different colors (or of a single color) and/or vibrate in response to the light emitting device being moved/rotated or when colliding with the shell of the ball 110 during play.

Figure 3:
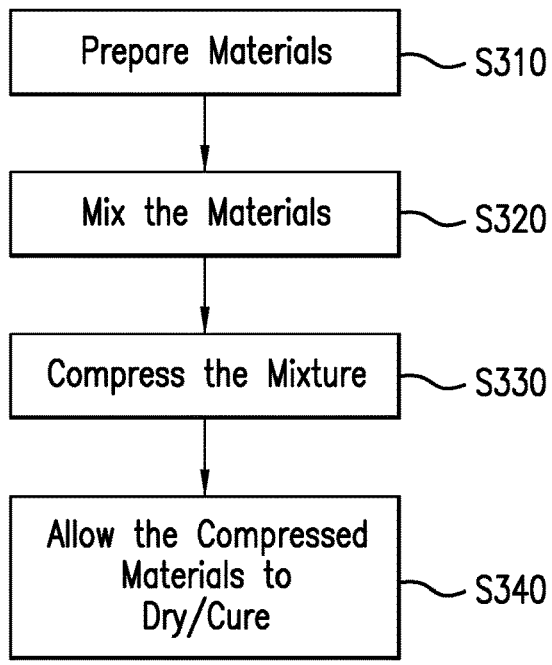
FIG. 3 is flow chart illustrating a method of forming a clump containing cat attractant material according to an exemplary embodiment of the present invention.

FIG. 3 is a flow chart illustrating a method of forming the clump 120 according to an exemplary embodiment of the present invention.

Referring to FIG. 3, operation S310 includes preparing the materials which will be used to make the clump 120. The materials used in operation S310 include at least one cat attractant material selected from a group consisting of catnip, silver vine, valerian root, and tatarian honeysuckle, as well as an antioxidant and a binder. Each of the cat attractant material, antioxidant and binder may be provided, for example, in powder form. Water may also be a material used in making the clump 120.

Operation S310 may include grinding the cat attractant material to particles of a size as described above with reference to FIGS. 1 and 2.

Operation S310 may also include providing a certain quantity of the cat attractant material, antioxidant, binder and/or water.

Operation S320 includes mixing the materials prepared in operation S310. The mixing process may include mixing the cat attractant material, the antioxidant and the binder with water. Operation S320 may include stirring the resulting mixture.

Operation S330 includes compressing the mixture obtained from operation S320. Operation S330 may include inserting the mixture obtained from operation S320 into a mold of a predetermined shape, and compressing the mixture within the mold. The mold may be compressed by power tools. For example, the mold may be compressed by a hydraulic press, a pneumatic press or a press powered by an electrical motor. Therefore, the mixture may be tightly compressed.

Alternatively, or in addition, the mixture obtained from operation S320 may be compressed by hand, or by using hand tools.

Operation S340 includes allowing the compressed mixture to dry and/or cure.

Figure 4:
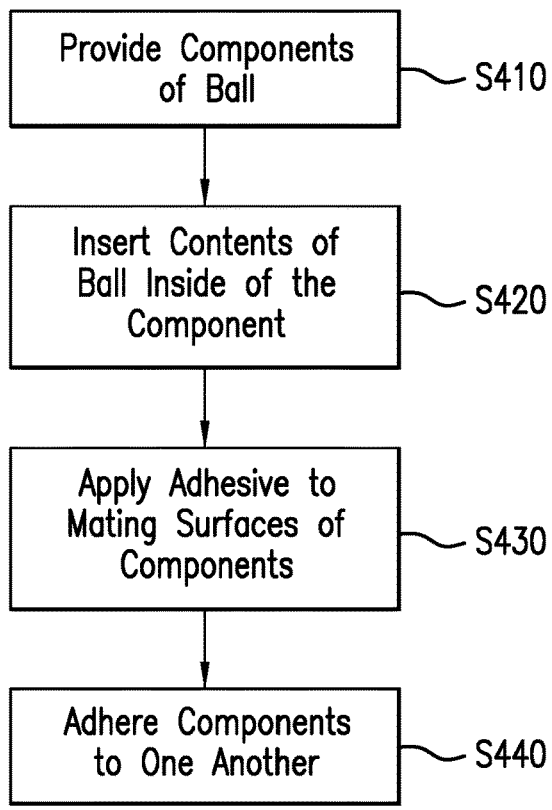
FIG. 4 is a flow chart illustrating a method of forming a toy according to an exemplary embodiment of the present invention.
Figure 5:
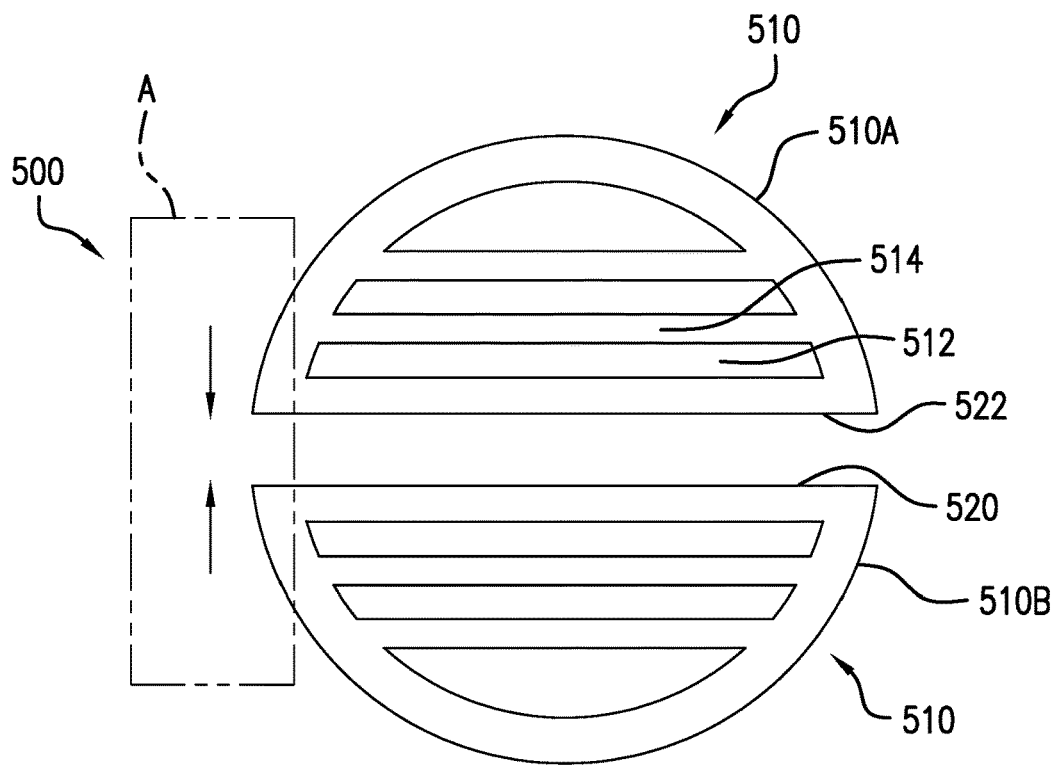
FIG. 5 is a side elevational view illustrating a toy formed by the method of FIG. 4 according to an exemplary embodiment of the present invention.

FIGS. 4 and 5 illustrate a method of forming a toy 500 according to an exemplary embodiment of the present invention.

Referring to FIGS. 4 and 5, operation S410 includes providing two or more components (see components 510A and 510B of FIG. 5), which, when assembled together, form a cat toy 500 of the present invention. The cat toy 500 may be similar to the cat toy 100 described above.

Referring to FIGS. 4 and 5, the components 510A and 510B may be mated to one another in order to form a ball 510 of the toy 500.

The components 510A and 510B may be rigid or flexible.

Each of the components 510A and 510B may include open portions 512 and closed portions 514, as shown in FIG. 5. However, it is understood that only one of the components 510A and 510B needs to have an open portion 512. In addition, at least one of the components 510A and 510B needs to have at least one sharp edge (analogous to the sharp edge 116) and/or at least one protrusion (analogous to the protrusion 118) along its interior surface.

Operation S420 includes inserting the contents of the toy 500 (not shown in the figures) inside at least one of the components 510A and 510B. The contents of the toy 500 include a clump of material similar to the clump 120, and may include a bell and/or a light emitting device as described above. The clump of material that is disposed inside at least one of the components 510A and 510B may be formed by using the method of FIG. 3.

Operation S430 includes applying adhesive to at least one of the mating surfaces 520 and 522 of the components 510B and 510A shown in FIG. 5.

It should be understood that the order of performing operations S420 and S430 may be reversed. For example, operation S430 may be performed prior to operation S420.

Operation S440 includes mating the surfaces 520 and 522 with adhesive, as shown in FIG. 5 by the two opposing arrows, in order to adhere the components 510A and 510B to one another, thereby forming the toy 500. The toy 500 includes inside the contents described with respect to operation S420.

It is understood that the method described with reference to FIGS. 4 and 5 may be used to assemble a toy that is either flexible or rigid.

In an exemplary embodiment, the components of a ball may be selectively coupled to one another such that the ball may be opened and closed as desired in order to add a new clump of cat attractant material inside of the ball, to remove an old clump of cat attractant material from the ball, as well as to add or remove additional toys to the ball's interior.

Figure 5A:
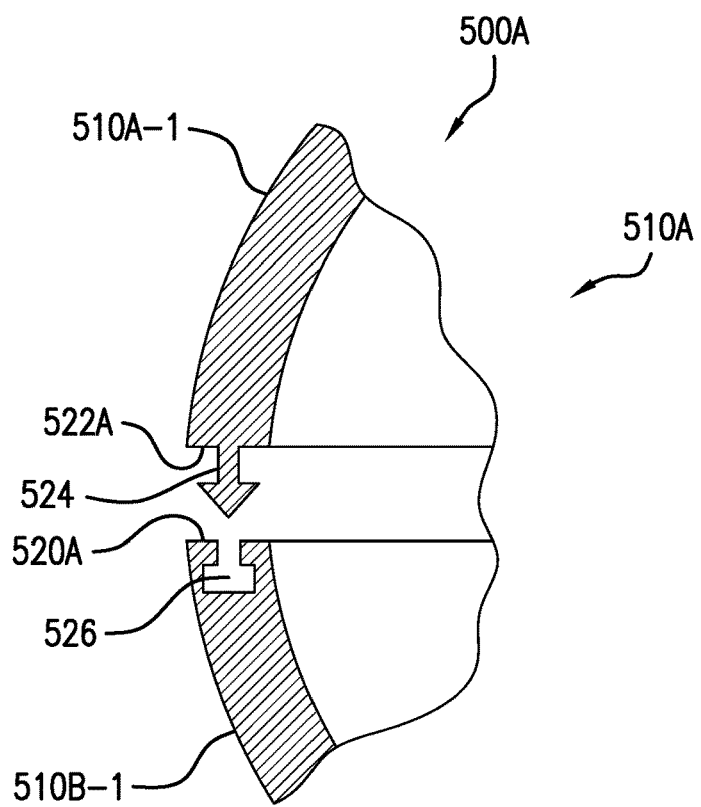
FIG. 5A is an enlarged view illustrating an alternative embodiment of the region A of the toy of FIG. 5.

FIG. 5A is an enlarged view illustrating an alternative embodiment of the region "A" of the toy illustrated in FIG. 5. As illustrated in FIG. 5A, a toy 500A may include a pair of selectively coupleable components 510A-1 and 510B-1. The components 510A-1 and 510B-1 together form a ball 510A.

Referring to FIG. 5A, the component 510A-1 may have a male coupling portion 524 disposed at a mating surface 522A, and the component 510B-1 may have a female coupling portion 526 disposed at a mating surface 520A. The male and female coupling portions 524 and 526 are configured to be selectively coupled to one another.

As can be appreciated, the male and female coupling portions 524 and 526 may be provided in plurality, respectively, along a length of the mating surfaces 522A and 520A. Thus, the components 510A-1 and 510B-1 can be selectively coupled/uncoupled from one another by selectively coupling/uncoupling the male and female coupling portions 524 and 526 to one another along the length of the mating surfaces 522A and 520A.

Accordingly, the toy 500A provides the flexibility of adding and/or removing cat attractant material as well as other components inside of the ball 510A when desired.

Although a male-female type of coupling mechanism is shown in FIG. 5A, it is understood that other types of coupling mechanisms may be used to selectively couple two or more components of a ball to one another. Examples of selective coupling mechanisms that may be employed to selectively couple two or more components of a ball include twist-and-lock mechanisms, threaded mechanisms, etc., which may be disposed along mating surfaces of the ball's components.

When a toy with a flexible or elastic shell (e.g., a flexible ball) is desired, the flexible shell may be manufactured in one piece, by, for example, injection molding, as compared to adhering two halves together, in order to reduce manufacturing costs. Since the flexible one-piece shell will include at least one open portion in its shell, the at least one open portion may be elastically deformed to be of a size large enough to allow the insertion of the contents described above inside of the flexible shell (operation S420). Therefore, a flexible toy of the present invention may be manufactured at a low cost and may induce a cat into play for a long period of time.

While the present invention has been particularly shown and described with reference to exemplary embodiments thereof, it will be apparent to those of ordinary skill in the art that various changes in form and detail may be made therein without departing from the spirit and scope of the present invention.

What is claimed is:

1. A cat toy, comprising:
   a hollow structure comprising a shell having an inner surface, the shell having a plurality of openings separated by a plurality of closed portions;
   a solid clump of material disposed within the shell and comprising cat attractant material;
   each of the plurality of openings having a width narrower than a width of the clump, one of the closed portions having a sharp edge forming a border of one of the openings and configured to at least one of scrape, shave and scratch the clump on impact of the clump with the sharp edge to expose fresh cat attractant material on an outer surface of the clump, and wherein the clump is visible through the openings and an aroma of the cat attractant material can escape through the openings while the solid clump of material remains entrapped within the hollow structure;
   the clump comprising a compressed material sufficiently solid to prevent breaking or crumbling of the clump inside of the hollow structure during use of the toy so as to minimize loss of material of the clump from the hollow structure and maintain the clump within the hollow structure for an extended period of play time, the clump having sufficient softness to permit fresh cat attractant material to be exposed when colliding with the sharp edge so as to release attractant material aroma.

2. The cat toy of claim 1, wherein the cat attractant material comprises at least one of catnip and silver vine.

3. The cat toy of claim 1, wherein the cat attractant material comprises a mixture of catnip and silver vine, and wherein a ratio of the catnip to silver vine ranges from 20:1 to 1:20.

4. The cat toy of claim 1, wherein the cat attractant material comprises granular material having particle sizes within a range from about 0.007 inch to about 0.04 inch.

5. The cat toy of claim 1, wherein the solid clump of material further comprises a binder.

6. The cat toy of claim 5, wherein the binder is a natural or artificial starch, natural or artificial wheat flour, tapioca flour or cassava flour, natural or artificial guar gum, xanthan gum or psylium gum, or an egg.

7. The cat toy of claim 5, wherein the solid clump of material further comprises an antioxidant.

8. The cat toy of claim 7, wherein the antioxidant comprises at least one of vitamin A, vitamin E, vitamin C, a beta carotene, lycopene, lutein, zeaxanthin, selenium, curcumin, alpha lipoic acid, and astaxanthin.

9. The cat toy of claim 7, wherein the solid clump comprises about 60% to about 95% cat attractant material by weight, about 4.5% to about 5% binder by weight, and about 0% to about 35% antioxidant by weight.

10. The cat toy of claim 1, wherein the hollow structure is a hollow ball.

11. The cat toy of claim 1, wherein the openings are elongated openings and the closed portions are elongated closed portions.

12. The cat toy of claim 1, further comprising a sharp member protruding inwardly from the inner surface of the shell, the member configured to at least one of scrape, shave and scratch the clump on impact of the clump with the member to expose fresh cat attractant material on the outer surface of the clump.

13. The cat toy of claim 12, wherein the sharp member comprises a blade with a sharpened edge, wherein the blade is configured to at least one of scrape, shave and scratch the solid clump in order to expose fresh cat attractant material on the outer surface of the solid clump.

14. A method of manufacturing a cat toy, the method comprising:
    forming a solid clump of material comprising cat attractant material;
    forming a hollow structure comprising a shell having an inner surface, the shell having a plurality of openings separated by a plurality of closed portions,
    disposing the solid clump of material inside of the shell;
    a width of each of the plurality of openings being narrower than a width of the solid clump of material, one of the closed portions having a sharp edge forming a border of one of the openings and configured to at least one of scrape, shave and scratch the clump on impact of the clump with the sharp edge to expose fresh cat attractant material on an outer surface of the clump, and wherein the clump is visible through the openings and an aroma of the cat attractant material can escape through the openings while the solid clump of material remains entrapped within the shell; and
    the clump comprising a compressed material sufficiently solid to prevent breaking or crumbling of the clump inside of the hollow structure during use of the toy so as to minimize loss of material of the clump from the hollow structure and maintain the clump within the hollow structure for an extended period of play time, the clump having sufficient softness to permit fresh cat attractant material to be exposed when colliding with the sharp edge so as to release attractant material aroma.

15. The method of claim 14, the step of forming the solid clump of material comprising providing the cat attractant material in powder form and compressing the powder.

16. The method of claim 14, the step of forming the hollow structure comprising:
    providing a first component of the hollow structure and a second component of the hollow structure, the first component including at least one elongated opening from among the plurality of openings, and selectively coupling the first and second components to one another or adhering the first and second components to one another.

17. A cat toy, comprising:

a hollow structure comprising a shell having an inner surface, the shell having a plurality of elongated openings, each respective opening having opposed elongated sides separated by a width of the opening;

a solid clump of material disposed within the shell and comprising a compressed mass of granulated cat attractant material and a binder, each of the respective widths of the plurality of openings is narrower than a width of the clump, wherein the clump is visible through the openings and an aroma of the cat attractant material can escape through the openings while the clump remains entrapped within the hollow structure;

one of the elongated sides of a first opening of the plurality of openings having a sharp edge configured to at least one of scrape, shave and scratch the clump on impact of the clump with the sharp edge to expose fresh cat attractant material on an outer surface of the clump;

wherein the clump comprises a compressed material sufficiently solid to prevent breaking or crumbling of the clump inside of the hollow structure during use of the toy so as to minimize loss of material of the clump from the hollow structure and maintain the clump within the hollow structure for an extended period of play time, the clump having sufficient softness to permit fresh cat attractant material to be exposed when colliding with the sharp edge so as to release attractant material aroma.

18. The cat ball of claim 17, a plurality of the elongated sides having a respective sharp edge configured to at least one of scrape, shave and scratch the clump on impact of the clump with the sharp edge to expose fresh cat attractant material on the outer surface of the clump.

19. The cat toy of claim 17, further comprising a sharp member protruding inwardly from the inner surface of the shell, the member configured to at least one of scrape, shave and scratch the clump on impact of the clump with the member to expose fresh cat attractant material on the outer surface of the clump.

20. The cat toy of claim 17, further comprising one of a bell and a light disposed within the shell.

* * * * *